US012488418B2

(12) United States Patent
Zhang et al.

(10) Patent No.: US 12,488,418 B2
(45) Date of Patent: Dec. 2, 2025

(54) ANALYZING COMPLEX SINGLE MOLECULE EMISSION PATTERNS WITH DEEP LEARNING

(71) Applicant: Purdue Research Foundation, West Lafayette, IN (US)

(72) Inventors: Peiyi Zhang, West Lafayette, IN (US); Fang Huang, West Lafayette, IN (US); Sheng Liu, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 313 days.

(21) Appl. No.: 18/493,899

(22) Filed: Oct. 25, 2023

(65) Prior Publication Data

US 2024/0062334 A1 Feb. 22, 2024

Related U.S. Application Data

(62) Division of application No. 17/309,027, filed as application No. PCT/US2019/036262 on Jun. 10, 2019, now Pat. No. 12,002,185.

(60) Provisional application No. 62/747,117, filed on Oct. 17, 2018.

(51) Int. Cl.
*G06T 3/4046* (2024.01)
*G01J 3/28* (2006.01)
*G01J 3/443* (2006.01)
*G01N 21/64* (2006.01)
*G06N 3/08* (2023.01)

(52) U.S. Cl.
CPC .......... *G06T 3/4046* (2013.01); *G01J 3/2823* (2013.01); *G01J 3/443* (2013.01); *G01N 21/6428* (2013.01); *G01N 21/6458* (2013.01); *G06N 3/08* (2013.01)

(58) Field of Classification Search
CPC ....... G06T 3/4046; G01J 3/2823; G01J 3/443; G01N 21/6428; G01N 21/6458; G06N 3/08

See application file for complete search history.

(56) References Cited

U.S. PATENT DOCUMENTS

2018/0075581 A1 3/2018 Shi et al.

OTHER PUBLICATIONS

Y. Lecun, L. Bottou, Y. Bengio, P. Haffner, Gradient-based learning applied to document recognition. Proc. IEEE 86, 2278-2324 (1998).
M. A. Nielsen, Neural Networks and Deep Learning (Determination Press, 2015).
C. Szegedy, Batch normalization: accelerating deep network training by reducing internal covariate shift. International Conference on Machine Learning 448-456 (2015).

(Continued)

*Primary Examiner* — Mark Roz
(74) *Attorney, Agent, or Firm* — Maginot, Moore & Beck LLP

(57) ABSTRACT

A fluorescent single molecule emitter simultaneously transmits its identity, location, and cellular context through its emission patterns. A deep neural network (DNN) performs multiplexed single-molecule analysis to enable retrieving such information with high accuracy. The DNN can extract three-dimensional molecule location, orientation, and wavefront distortion with precision approaching the theoretical limit of information content of the image which will allow multiplexed measurements through the emission patterns of a single molecule.

11 Claims, 7 Drawing Sheets

(56) References Cited

OTHER PUBLICATIONS

K. He, X. Zhang, S. Ren, J. Sun, Delving deep into rectifiers: surpassing human-level performance on ImageNet classification. Proc. of the IEEE international conference on computer vision. 1026-1034 (2015).
F. Huang et al., Ultra-high resolution 3D imaging of whole cells. Cell 166, 1028-1040 (2016).
J. C. Wyant, K. Creath, "Basic wavefront aberration theory for optical metrology" in Applied Optics and Optical Engineering, (Academic, New York, 1992), vol. XI, pp. 1-53.
S. Liu, Development of optical systems and imaging analyses for hyperspectral microscopy and 3D super-resolution imaging. (ProQuest Dissertations & Theses Global, 2014).
K. I. Mortensen, L. S. Churchman, J. A. Spudich, H. Flyvbjerg, Optimized localization analysis for single-molecule tracking and super-resolution microscopy. Nat. Methods 7, 377-381 (2010).
C. S. Smith, N. Joseph, B. Rieger, K. A. Lidke, Fast, single-molecule localization that achieves theoretically minimum uncertainty. Nat. Methods 7, 373-375 (2010).
B. M. Hanser, M. G. L. Gustafsson, D. A. Agard, J. W. Sedat, Phase-retrieved pupil functions in wide-field fluorescence microscopy. J. Microsc. 216, 32-48 (2004).
S. R. Pavani, et al., Three-dimensional, single-molecule fluorescence imaging beyond the diffraction limit by using a double-helix point spread function. Proc. Natl Acad. Sci. USA 106, 2995-2999 (2009).
R. Piestun, Y. Y. Schechner, J. Shamir, Propagation-invariant wave fields with finite energy. J. Opt. Soc. Am. A. 17, 294 (2000).
R. J. Ober, S. Ram, E. S. Ward, Localization accuracy in single-molecule microscopy. Biophys. J. 86, 1185-1200 (2004).
S. Liu, K. A. Lidke, A multiemitter localization comparison of 3D superresolution imaging modalities. ChemPhysChem. 15, 696-704 (2014).
B. Wang, M. J. Booth, Optimum deformable mirror modes for sensorless adaptive optics. Opt. Commun. 282, 4467-4474 (2009).
S. Liu, E. B. Kromann, W. D. Krueger, J. Bewersdorf, K. A. Lidke, Three dimensional single molecule localization using a phase retrieved pupil function. Opt. Express 21, 29462 (2013).
T. J. Gould, et al., Nanoscale imaging of molecular positions and anisotropies. Nat. Methods 5, 1027-1030 (2008).
S. Moon, et al., Spectrally resolved, functional super-resolution microscopy reveals nanoscale compositional heterogeneity in live-cell membranes. J. Am. Chem. Soc. 139, 10944-10947 (2017).
F. Huang, S. L. Schwartz, J. M. Byars, K. A. Lidke, Simultaneous multiple-emitter fitting for single molecule super-resolution imaging. Biomed Opt Express 2, 1377-1393 (2011).
B. Q. Dong, et al., Super-resolution spectroscopic microscopy via photon localization. Nat. Commun.7, 12290 (2016).
M. P. Backlund, M. D. Lew, A. S. Backer, S. J. Sahl, W. E. Moerner, The role of molecular dipole orientation in single-molecule fluorescence microscopy and implications for super-resolution imaging. ChemPhysChem 15, 587-599 (2014).
Y. Li, et al., Real-time 3D single-molecule localization using experimental point spread functions. Nat. Methods 15, 367-369 (2018).
H. P. Babcock, X. Zhuang, Analyzing single molecule localization microscopy data using cubic splines. Sci. Rep. 7, 552 (2017).
Y. LeCun, Y. Bengio, Convolutional networks for images, speech and time-series. in The Handbook of Brain Theory and Neural Networks 255-258 (MIT Press, 1995).
A. Krizhevsky, I. Sutskever, G. E. Hinton, ImageNet classification with deep convolutional neural networks. Advances in neural information processing systems. 1097-1105 (2012).
X. Glorot, Y. Bengio, Understanding the difficulty of training deep feedforward neural networks. Proc. of the 13th International Conference on Artificial Intelligence and Statistics. 249-256 (2010).

K. He, X. Zhang, S. Ren, J. Sun, Deep residual learning for image recognition. Proc. of the IEEE conference on computer vision and pattern recognition 770-778 (2016).
V. Nair, G. E. Hinton, Rectified linear units improve restricted Boltzmann machines. Proc. of the 27th international conference on machine learning 807-814 (2010).
C. R. Rao, Linear statistical inference and its applications (Wiley, New York, ed. 2, 2002).
D. E. Rumelhart, G. E. Hinton, R. J. Williams, Learning representations by back-propagating errors. Nature 323, 533-536 (1986).
D. P. Kingma, J. Ba, Adam: a method for stochastic optimization, https://arxiv.org/abs/1412.6980 (2014).
S. Ruder, An overview of gradient descent optimization algorithms, https://arxiv.org/abs/1609.04747 (2016).
J. W. Goodman, Introduction to Fourier Optics. (Roberts & Company Publishers, Greenwood Village, ed. 3, 2005).
S. R. P. Pavani, R. Piestun, High-efficiency rotating point spread functions. Opt. Express 16, 3484 (2008).
J. D. Jackson, Classical Electrodynamics. (Wiley, New York, ed. 3, 1998).
M. Böhmer, J. Enderlein, Orientation imaging of single molecules by wide-field epifluorescence microscopy. J. Opt. Soc. Am. B. 20, 554 (2003).
B. Richards, E. Wolf, Electromagnetic diffraction in optical systems. II. Structure of the image field in an aplanatic system. Proc. R. Soc. Lond. A Math. Phys. Sci. 253, 358-379 (1959).
J. Enderlein, E. Toprak, P. R. Selvin, Polarization effect on position accuracy of fluorophore localization. Opt. Express 14, 8111 (2006).
A. Small, S. Stahlheber, Fluorophore localization algorithms for super-resolution microscopy. Nature Methods 11, 267-279 (2014).
S. M. Kay, Fundamentals of statistical signal processing, vol. I: estimation theory. (Prentice Hall, 1993).
B. Huang, S. A. Jones, B. Brandenburg, X. Zhuang, Whole-cell 3D Storm reveals interactions between cellular structures with nanometer-scale resolution. Nat. Methods 5, 1047-1052 (2008).
D. Patra, I. Gregor, J. Enderlein, Image analysis of defocused single-molecule images for three dimensional molecule orientation studies. J. Phys. Chem. A. 108, 6836-6841 (2004).
S. Quirin, S. R. P. Pavani, R. Piestun, Optimal 3D single-molecule localization for superresolution microscopy with aberrations and engineered point spread functions. Proc. Natl. Acad. Sci. USA 109, 675-679 (2012).
R. McGorty, J. Schnitzbauer, W. Zhang, B. Huang, Correction of depth-dependent aberrations in 3D single-molecule localization and super-resolution microscopy. Opt. Lett. 39, 275 (2014).
P. N. Petrov, Y. Shechtman, W. E. Moerner, Measurement-based estimation of global pupil functions in 3D localization microscopy. Opt. Express 25, 7945 (2017).
M. Booth, T. Wilson, H.-B. Sun, T. Ota, S. Kawata, Methods for the characterization of deformable membrane mirrors. Appl. Opt. 44, 5131-5139 (2005).
N. Boyd, E. Jonas, H. P. Babcock, B. Recht, DeepLoco: Fast 3D Localization Microscopy Using Neural Networks, https://www.biorxiv.org/content/early/2018/02/16/267096 (2018).
Z. Zhang, S. J. Kenny, M. Hauser, W. Li, K. Xu, Ultrahigh-throughput single-molecule spectroscopy and spectrally resolved super-resolution microscopy. Nat. Methods 12, 935-938 (2015).
K. A. Lidke, B. Rieger, D. S. Lidke, T. M. Jovin, The role of photon statistics in fluorescence anisotropy imaging. IEEE Trans. Image Process. 14, 1237-1245 (2005).
Narodytska, et al. "Verifying properties of binarized deep neural networks." [online] published Apr. 26, 2018. Thirty-Second AAAI Conference on Artificial Intelligence. [retrieved Nov. 11, 2019] Retrieved from th Internet <URL: https://www.aaai.org/ocs/index.php/AAAI/AAAI18/paper/viewPaper/16898> p. 6617; p. 6622, col. 1 to col. 2.
Pham, et al . . . Performance of optimal registration estimators. InVisual Information Processing XIV May 2, 20055 (vol. 5817, pp. 133-144). International Society for Optics and Photonics. [retrieved Nov. 11, 2019] Retrieved from the Internet <URL: http://citeseerx.ist.psu.edu/viewdoc/download?doi=10.1.1.962.5939&rep=rep1&type=pdf> (p. 133; p. 135, 137).

(56) References Cited

OTHER PUBLICATIONS

Liu K, et al. Fast 30 cell tracking with wide-field fluorescence microscopy through deep learning. arXiv preprint arXiv:1805.05139. May 14, 2018. [retrieved Nov. 11, 2019] Retrieved from th Internet <URL: https://arxiv.org/pdf/1805.05139.pdf> p. 4 to p. 5.

International Search Report corresponding to International Patent Application No. PCT/US2019/036262, dated Nov. 27, 2019 (8 pages).

| PSF types | x,y range (pixel) | z range (nm) | α range (°) | β range (°) | Zer range (mλ) | I range (photon) | bg range (photon) | data size (pixel) |
|---|---|---|---|---|---|---|---|---|
| Astigmatism PSF (1 μm from cover glass) | -2 to 2 | -800 to 800 | — | — | — | 100 to 10000 | 1 to 30 | 16 x 16 x $10^6$ |
| Astigmatism PSF (12 μm from cover glass) | -2 to 2 | -800 to 800 | — | — | — | 100 to 10000 | 1 to 30 | 16 x 16 x $10^6$ |
| Complex PSF (recorded) | -2 to 2 | -1400 to 1400 | — | — | — | 2000 to 30000 | 1 to 10 | 32 x 32 x 200000 |
| Complex PSF (simulated) | -2 to 2 | -2000 to 2000 | — | — | — | 2000 to 30000 | 1 to 10 | 32 x 32 x 200000 |
| Double-helix PSF | -2 to 2 | -1200 to 1200 | — | — | — | 500 to 10000 | 1 to 30 | 32 x 32 x $10^6$ |
| Dipole PSF | -2 to 2 | -500 to 500 | 0 to 90 | 0 to 360 | — | 1000 to 10000 | 1 to 10 | 32 x 32 x $10^6$ |
| Wavefront distorted PSF (12 Zernike modes, water objective) | -1 to 1 | -500 to 500 | — | — | -238.74 to 238.74 | 100 to 10000 | 1 to 30 | 16 x 16 x 800000 |
| Wavefront distorted PSF (21 Zernike modes, water objective) | -1 to 1 | -500 to 500 | — | — | -238.74 to 238.74 | 100 to 10000 | 1 to 30 | 16 x 16 x 50000000 |
| Wavefront distorted PSF (12 Zernike modes, oil objective) | -1 to 1 | -500 to 500 | — | — | -238.74 to 238.74 | 100 to 10000 | 1 to 60 | 16 x 16 x 1200000 |

FIG. 6

| building block (index) | | | Kernel size | | | Stride* | | | Output size | | |
|---|---|---|---|---|---|---|---|---|---|---|---|
| M0 | M1 | M2 | M0 | M1 | M2 | M0 | M1 | M2 | M0 | M1 | M2 |
| Conv**(1) | | | C x 7 x 7 | | | 1 | | | 64 x N x N | | |
| Conv (2) | | | 64 x 5 x 5 | | | 1 | | | 128 x N x N | | |
| Res***(1-3) | | | $\begin{bmatrix}128\times3\times3\\32\times3\times3\\64\times3\times3\end{bmatrix}$ | | | $\begin{bmatrix}1\\1\\1\end{bmatrix}$ | | | $\begin{bmatrix}32\times N\times N\\64\times N\times N\\128\times N\times N\end{bmatrix}$ | | |
| Res(4) | | | $\begin{bmatrix}128\times3\times3\\64\times3\times3\\128\times3\times3\end{bmatrix}$ | | | $\begin{bmatrix}1\\1\\1\end{bmatrix}$ | | $\begin{bmatrix}1\\4\\1\end{bmatrix}$ | $\begin{bmatrix}64\times N\times N\\128\times N\times N\\256\times N\times N\end{bmatrix}$ | $\begin{bmatrix}64\times N\times N\\128\times\frac{N}{4}\times\frac{N}{4}\\256\times\frac{N}{4}\times\frac{N}{4}\end{bmatrix}$ | |
| Res(5-7) | | | $\begin{bmatrix}256\times3\times3\\64\times3\times3\\128\times3\times3\end{bmatrix}$ | | | $\begin{bmatrix}1\\1\\1\end{bmatrix}$ | | | $\begin{bmatrix}64\times N\times N\\128\times N\times N\\256\times N\times N\end{bmatrix}$ | $\begin{bmatrix}64\times\frac{N}{4}\times\frac{N}{4}\\128\times\frac{N}{4}\times\frac{N}{4}\\256\times\frac{N}{4}\times\frac{N}{4}\end{bmatrix}$ | |
| -- | Res(8) | -- | | $\begin{bmatrix}1024\times3\times3\\256\times3\times3\\512\times3\times3\end{bmatrix}$ | -- | | $\begin{bmatrix}1\\4\\1\end{bmatrix}$ | -- | | $\begin{bmatrix}256\times\frac{N}{4}\times\frac{N}{4}\\512\times\frac{N}{16}\times\frac{N}{16}\\1024\times\frac{N}{16}\times\frac{N}{16}\end{bmatrix}$ | -- |
| -- | Res (9-11) | -- | | $\begin{bmatrix}1024\times3\times3\\256\times3\times3\\512\times3\times3\end{bmatrix}$ | -- | | $\begin{bmatrix}1\\1\\1\end{bmatrix}$ | -- | | $\begin{bmatrix}256\times\frac{N}{4}\times\frac{N}{4}\\512\times\frac{N}{16}\times\frac{N}{16}\\1024\times\frac{N}{16}\times\frac{N}{16}\end{bmatrix}$ | -- |
| Conv (3) | | -- | 256x1x1 | 1024x1x1 | | 1 | | | 128xNxN | $128\times\frac{N}{4}\times\frac{N}{4}$ | 21 |
| Conv (4) | | -- | 128x1x1 | -- | | 1 | -- | | 64xNxN | $64\times\frac{N}{4}\times\frac{N}{4}$ | -- |
| Conv (5) | | -- | 64x1x1 | -- | | 1 | -- | | 1xNxN | $1\times\frac{N}{4}\times\frac{N}{4}$ | -- |
| FC (1) | | -- | -- | | | -- | | | 10 | 12 | -- |
| FC (2) | | -- | -- | | | -- | | | 2 or 1 | -- | -- |

FIG. 7

ANALYZING COMPLEX SINGLE MOLECULE EMISSION PATTERNS WITH DEEP LEARNING

PRIORITY CLAIM

This application is a divisional application of U.S. patent application Ser. No. 17/309,027, filed on Apr. 15, 2021, the disclosure of which is herein incorporated by reference in its entirety. U.S. patent application Ser. No. 17/309,027 is a 35 U.S.C. § 371 National Stage Application of PCT/US2019/36262, filed on Jun. 10, 2019, the disclosure of which is herein incorporated by reference in its entirety. PCT/US2019/36262 claims the benefit of priority of U.S. Provisional Application No. 62/747,117, filed on Oct. 17, 2018, the disclosure of which is herein incorporated by reference in its entirety.

BACKGROUND

Optical spectroscopy of a single molecule has developed into a powerful technique for exploring the individual nanoscale behavior of molecules in complex local environments. Observing a single molecule removes the ensemble average, allowing the exploration of hidden heterogeneity in complex condensed phases as well as direct observation of dynamical state changes arising from photophysics and photochemistry. Microscopic methods include the widefield techniques of epifluorescence and total internal reflection, as well as confocal and near-field optical scanning microscopy. In order to extract the maximum amount of information from an experiment, a wide array of properties of the emission can be recorded, such as polarization, spectrum, degree of energy transfer, and spatial position. Whatever variable is measured, the time dependence of the parameter can yield information about excited state lifetimes, photochemistry, local environmental fluctuations, enzymatic activity, quantum optics, and many other dynamical effects. Single-molecule spectroscopy and microscopy has become a useful tool for the study of dynamics in complex systems, especially where ensemble averaging or lack of synchronization may obscure the details of the process under study.

Analyzing single-molecule emission patterns thus play a critical role in retrieving the structural and physiological information of their tagged targets and in understanding their interactions and cellular context. These emission patterns of tiny light sources directed at the subject molecule, known as "point spread functions" or PSFs, encode information such as the molecule's location, orientation and environment within the specimen, as well as the path the emitted photons took before reaching the detection device or camera. (See, W. E. Moerner, D. P. Fromm, Methods of single-molecule fluorescence spectroscopy and microscopy, *Review of Scientific Instruments* 74, 3597-3619 (2003); A. von Diezmann, Y. Shechtman, W. E. Moerner, Three-Dimensional Localization of Single Molecules for Super-Resolution Imaging and Single-Particle Tracking, *Chem. Rev.* 117, 7244-7275 (2017); M. P. Backlund, M. D. Lew, A. S. Backer, S. J. Sahl, W. E. Moerner, The role of molecular dipole orientation in single-molecule fluorescence microscopy and implications for super-resolution imaging, *ChemPhysChem* 15, 587-599 (2014); S. Moon et al., Spectrally resolved, functional super-resolution microscopy reveals nanoscale compositional heterogeneity in live-cell membranes, *J. Am. Chem. Soc.* 139, 10944-10947 (2017); and D. Burke, B. Patton, F. Huang, J. Bewersdorf, M. J. Booth, Adaptive optics correction of specimen-induced aberrations in single-molecule switching microscopy, *Optica* 2, 177-185 (2015), the disclosures of which are expressly incorporated herein by reference).

Detecting and tracking single-fluorescent probes through their emission patterns lay the foundation of modern single-molecule based imaging methods. Exemplary patterns encoded within PSFs, as discussed in the current literature, are shown in FIG. 1, including axial position, lateral position, wavefront distortion and dipole orientation. As shown in FIG. 1, the particular PSF pattern is indicative of a specific physical characteristic of the molecule. For instance, the different axial positions or z-directions from 400 nm to −400 nm exhibit different PSF patterns. The imaging methods allow interrogation of cellular dynamics, transcriptional regulation and protein interaction, and further enable single-molecule based super-resolution imaging in both fixed and living specimens. (See, N. L. Andrews et al., Actin restricts FcepsilonRI diffusion and facilitates antigen-induced receptor immobilization, *Nat. Cell Biol.* 10, 955-963 (2008); A. M. Femino, F. S. Fay, K. Fogarty, R. H. Singer, Visualization of single RNA transcripts in situ, *Science* 280, 585-590 (1998); T. Ha et al., Probing the interaction between two single molecules: fluorescence resonance energy transfer between a single donor and a single acceptor, *Proc. Natl. Acad. Sci.* 93, 6264-6268 (1996); D. Baddeley, J. Bewersdorf, Biological Insight from Super-Resolution Microscopy: What We Can Learn from Localization-Based Images, *Annu. Rev. Biochem.* 87, 965-989 (2018), the entire disclosures of which are expressly incorporated herein by reference).

One key in single molecule studies is to understand how the features of the PSF encode the properties of a single molecule, i.e., the analysis of single molecule emission pattern. Conventionally, the analysis focuses on dominant and recognizable features of the PSFs, such as rotation of the double helix PSF, and on modeling feature changes through a simplified mathematical form, e.g., a PSF model. (See, S. Coz, Super-resolution imaging in live cells, *Dev. Biol.* 401, 175-81 (2014); and D. Sage, et al. Quantitative evaluation of software packages for single-molecule localization microscopy, *Nat. Methods* 12, 717-724 (2015), the entire disclosures of which are expressly incorporated herein by reference). Most recently, interpolation based numerical methods, such as splines, have been demonstrated for three-dimensional localization of single molecules. (See, H. P. Babcock, X. Zhuang, Analyzing single molecule localization microscopy data using cubic splines, *Sci. Rep.* 7, 552 (2017); and Y. Li et al., Real-time 3D single-molecule localization using experimental point spread functions, *Nat. Methods* 15, 367-369 (2018), the entire disclosures of which are expressly incorporated herein by reference).

However, the number of parameters required in the interpolation scales up exponentially with increasing PSF complexities and measurement dimensions, challenging its application in retrieving information carried by high-dimensional PSFs. Conventional analysis of these multiplex single molecule data relies on a measurable feature of the diffraction pattern such as intensity distribution or peak location in spatial or spectrum channel. Parameterized models often do not exist or are not suitable for practical analysis for thousands to millions of single molecules per single-molecule switching nanoscopy (SMSN) dataset. Conventional regression methods based on numerically approximated models, such as splines, have been demonstrated to perform three-dimensional localization of single molecules in both CPU and GPU. But, multiplex measurements of single molecule require high-dimensional data models. For example, simultaneous measurement of spatial location (x, y and z) together with the polar and azimuthal angles of a single molecule in a 32×32 pixel image require about 22 billion parameters to construct a cubic-spline model, making storage and utilization of such a model extremely challenging (~170 GB per model). Furthermore, single-molecule emission patterns carry multiple classes of molecular information simultaneously. Due to difficulties in perceiving and summarizing a comprehensive PSF model, retrieving multiplexed information beyond 3D position from complex or high-dimensional single-molecule data remains challenging.

Neural networks have been applied to identify some characteristics of single molecules. As used herein, neural networks are machine learning systems used to derive rule bases for evaluating unclassified data using pre-classified or "training" datasets. These rule bases are instructions that configure a data analysis agent, such as a processor, to classify new data passed to the system. Furthermore, the rule base is configurable such that the rule base itself is updatable, extensible or modifiable in response to new unclassified data, such as by modifying weights applied to parameters implemented by the neural network. Recently, a neural network in its basic form (1-2 fully-connected layers) has been utilized to identify fluorophore species in single-molecule fluorescence lifetime experiments as well as to speed up dipole orientation estimation from an analytical approximation of the dipole PSF. (See, B. P. Bowen, A. Scruggs, J. Enderlein, M. Sauer, N. Woodbury, Implementation of neural networks for the identification of single molecules, *J. Phys. Chem. A* 108, 4799-4804 (2004); and Y. Zhang, et al., Ultrafast, accurate, and robust localization of anisotropic dipoles, *Protein & Cell* 4, 598-606 (2013), the entire disclosures of which are expressly incorporated herein by reference).

Deep neural networks (DNN) extract features from an input and automatically learn the connection of the input to an output. Through the architecture of DNN, the complex mapping between input and output is extracted from different levels of features hierarchically. The inference precision, instead of depending on domain expertise (e.g. feature recognition), now mainly depends on the design of the network architecture.

There is a significant need for a DNN that can extract three-dimensional molecule location, orientation, and wavefront distortion with precision approaching the theoretical limit which will allow multiplexed measurements through the emission pattern of a single molecule.

SUMMARY OF THE DISCLOSURE

A deep neural network is configured to extract multiplexed physical information carried by single-molecule patterns, avoiding conventional steps such as feature recognition, model simplification, and the iterative regression methods. The multiplexed information can include molecule location, dipole orientation and wavefront distortions from complex and subtle features of the point spread functions (PSFs) in an image of the molecule. In one aspect of the disclosure, the neural network utilizes an information weighted cost function to train the network. In one embodiment, the information weighting uses the Cramér-Rao lower bound (CRLB) for the information in the PSF so that the precision of the neural network output approaches the information limit for the particular physical information in the PSF. In this embodiment, the CRLB is in the denominator of a mean squared error calculation. Other forms of weighting based on the anticipated information content of the PSF are contemplated such as an expected uncertainty of estimation due to noise or a measure of a signal-to-noise ratio.

Thus, in one embodiment of the present disclosure, a computer-implemented method is provided for training a neural network for use in extracting physical information from point spread function (PSF) emission patterns of single molecule fluorophores, the emission patterns corresponding to ground truth parameters $\theta_{tm}$ indicative of the physical information of the molecule. The method contemplates the steps of:

(a) acquiring a dataset of a plurality of N×N pixel images $A_n$ of the PSF emission patterns and providing the dataset to a processor;

(b) forward propagating the dataset through a neural network, with the processor, comprising a plurality of convolutional and residual layers l and a plurality of training parameters $w^l$ in the layers l, to generate an output vector of a number of physical parameters $\hat{\theta}_{tm}$ in a $k^{th}$ iteration through the neural network;

(c) comparing, with the processor, the output physical parameters $\hat{\theta}_{tm}$ to the ground truth parameters $\theta_{tm}$ by calculating a Cramér-Rao lower bound (CRLB)-weighted mean squared error (MSE) based on the equation $$E_{\hat{\theta}} = \frac{1}{NT}\sum_{n=1}^{N}\sum_{t=1}^{T}\frac{(\hat{\theta}_{tn} - \theta_{tn})^2}{CRLB_{\theta_{tn}}},$$

where N is the number of images $A_n$, T is the size of the output vector for each image, and $CRLB_{\theta_{tn}}$ is the value of the Cramér-Rao lower bound (CRLB) for parameter $\theta_t$ of image $A_n$;

(d) updating, with the processor, the parameters $w^l$ of the layers l of the neural network based on the derivative of the CRLB-weighted MSE according to the equation $$w_{k+1}^l = w_k^l - \frac{\eta}{M}\sum_{n=1}^{M}\frac{\partial E_{\theta n,k}}{\partial w_{n,k}^l},$$

where l=0,1,2, . . . L denotes the layers in the neural network, η is the learning rate, k is the iteration number, and M is the number of images $A_n$;

(e) repeating steps (b)-(d) until the error $E_{\hat{\theta}}$ reaches a predetermined limit or plateau, after which the parameters $w^l$ of the layers l of the neural network are assigned, with the processor, the updated values of the last iteration.

In a further aspect of the disclosure, the acquired data set is split into a training dataset and a validation dataset. The error determination in the validation dataset is compared to the predetermined limit or plateau to thereby determine when the training process is complete. For each iteration of the training sequence, the same datasets are evaluated (training and validation), but the datasets are shuffled prior to forward propagating the datasets through the neural network.

In a further aspect of the disclosure, the trained neural network receives a dataset for a new image of a new molecule to identify unknown physical parameters from the PSF of that new image. The new dataset is forward propagated through the trained neural network to generate an output vector of values corresponding to one or more unknown physical parameters.

DESCRIPTION OF THE FIGURES

FIG. 6 is chart of the physical information data ranges detected using the neural network in the exemplary embodiment disclosed herein.

FIG. 7 is a chart of the configuration of the layers of the neural network disclosed in the exemplary embodiment herein.

DETAILED DESCRIPTION

Figure 1:
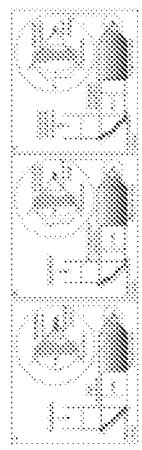
FIG. 1 is a diagram of physical information encoded in the point spread function (PSF) of a single molecule image.
Figure 1:
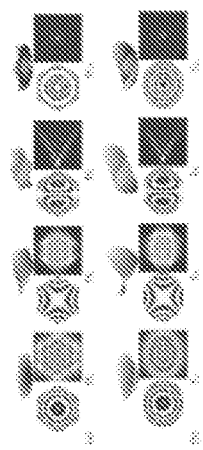
Figure 1:
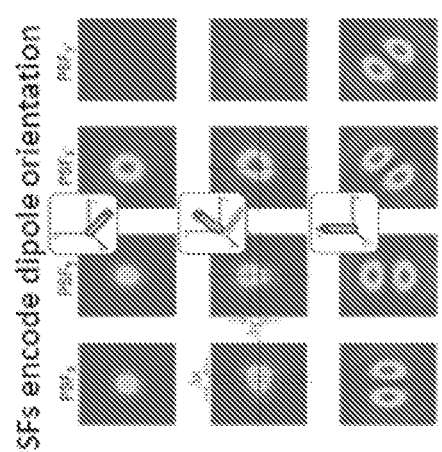
Figure 1:
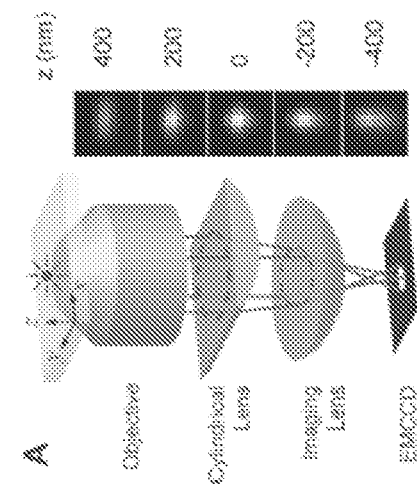
Figure 1:
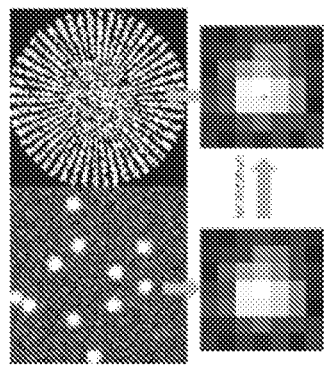

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

In accordance with one feature of the present disclosure, deep learning or deep neural networks (DNN) are implemented, with a computer processor, to extract multiplexed information carried by single-molecule emission patterns (i.e., point spread functions (PSF)), rather than conventional techniques such as feature recognition, model simplification, and iterative regression. The network tackles each inference task independently allowing complexities in each dimension to add instead of multiplying. The DNN architecture disclosed herein can be trained to efficiently extract both molecular and specimen information, such as molecule location, dipole orientation and wavefront distortions from complex and subtle features of the PSFs, which otherwise are considered too complex for established algorithms. Once trained, the DNN can be applied to any new PSF image to determine the information content in that image.

Figure 2:
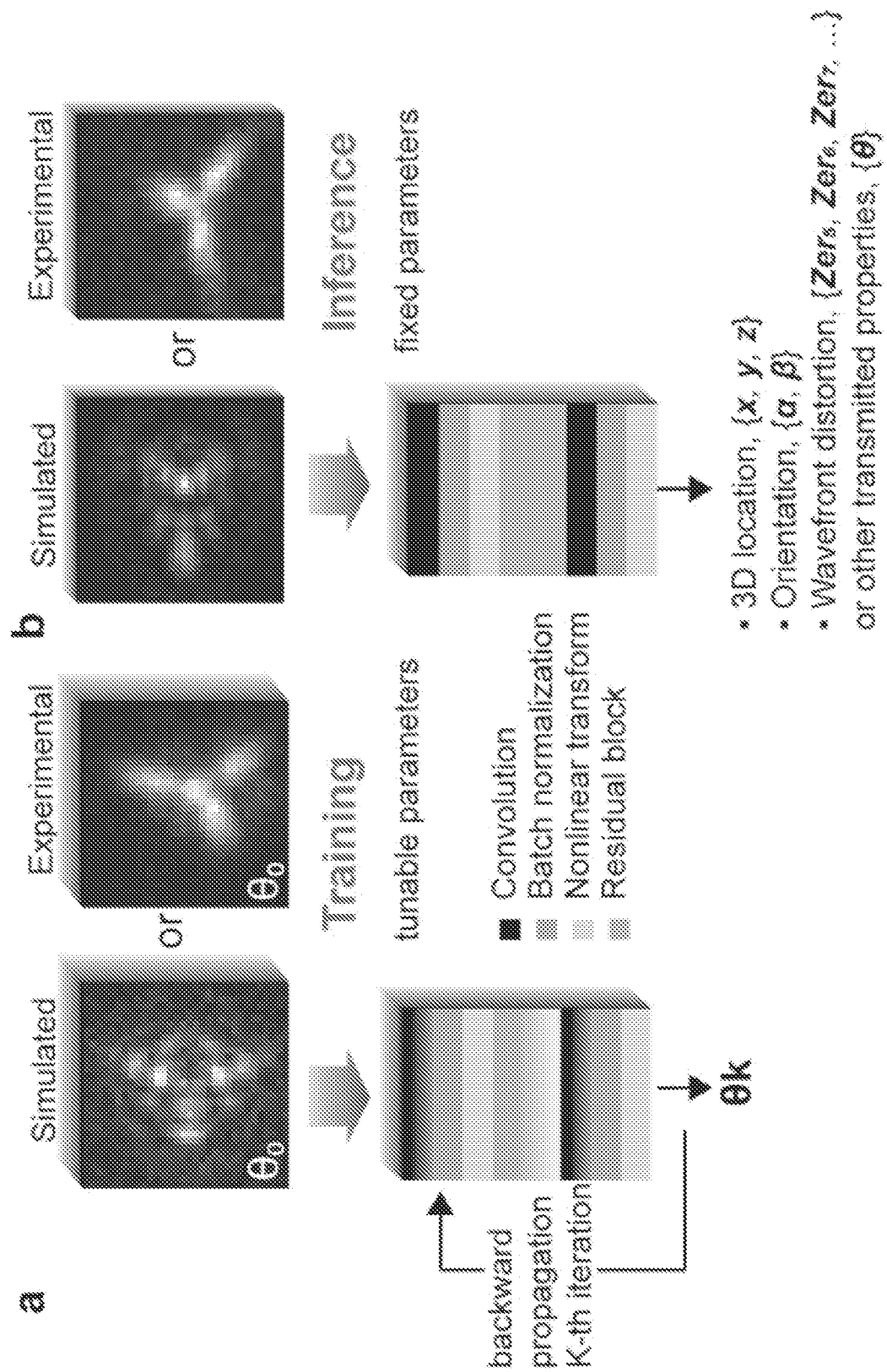
FIG. 2 is a diagram of the training and inference phases of operation of the neural network disclosed herein.

The general principle of the DNN according to the present disclosure is illustrated with reference to FIGS. 2-6. For clarity, this DNN is referred to herein as "smNet" for "single molecule deep neural network". smNet is implemented within a computer processor in a known manner for neural networks. The general principle of smNet is depicted in FIG. 2, in which (a) represents the training phase of the neural network, and (b) represents the "inference" phase in which information is extracted from a PSF with unknown parameters. In the training phase, the PSF of a simulated or experimental image is fed through an iterative sequence of convolution, batch normalization, non-linear transformation and residual block layers to tune parameters and/or weights, of the neural network. The simulated/experimental PSF has known transmitted properties $\theta_0$ and the training phase (a) for the neural network generates a value $\theta_k$ with each iteration such that the error between $\theta_0$ and $\theta_k$ is successively minimized. Once tuned, these parameters and/or weights become the fixed parameters used in the neural network in the inference phase (b) to determine the transmitted properties in an unknown PSF. In the specific embodiments discussed herein, the transmitted properties include 3D location $\{x_n, y_n, z_n\}$ of the single molecule being imaged, the orientation $\{\alpha_n, \beta_n\}$ of the molecule, and the wavefront distortion of the photons emanating from the molecule and passing through other structure $\{Zer_{5n}, Zer_{6n} \ldots Zer_{16n}$ or $Zer_{25n}\}$.

Figure 3:
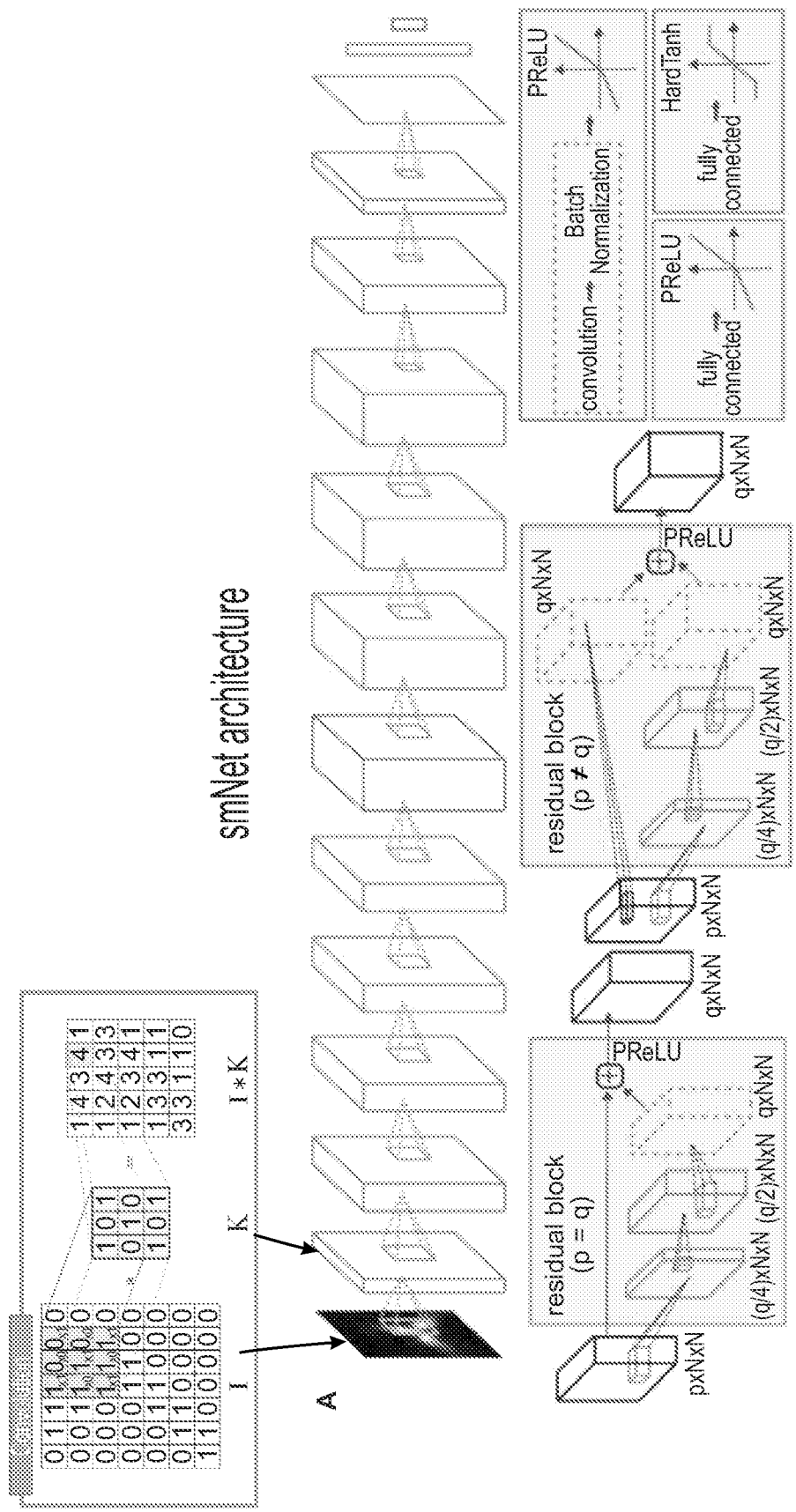
FIG. 3 is a schematic of the architecture of the neural network disclosed herein.

The basic architecture of the smNet neural network is depicted in FIG. 3. In this embodiment, the input I is a 3D image of C×N×N pixels obtained by a digital camera and associated optics, where the image size N=16 or 32, and the number of channels C=1 or 2 for single plane or biplanar PSFs. The image data passes through the chain of neural network layers represented by the rectangles CO (for convolutional layers) through which the kernel K is applied to the image I, RE1 (for residual layers in which the number of feature maps is unchanged, (p=q)), RE2 (for residual layers in which the number of feature maps is changed, (p≠q)), FC (for fully connected layers) and HT (for HardTanh layers) to generate an output estimation O. The kernel K is a filter with an initial predetermined unity value that is used to initiate the convolution, backward propagation and updating processes as described here.

In the illustrated embodiment, smNet includes 27 to 36 layers consisting of convolutional layers, residual blocks and fully connected layers, together with batch normalization and parametric rectified linear units (PReLU). The complex and subtle features of interest embedded in the PSF (point spread function) lie in the photon distribution within a small sub-region, usually 2-10 $\mu m^2$. To fully utilize the information contained in the spatial domain, a larger kernel size is used in the beginning layers of smNet, and a number of convolutional layers and 'bottleneck' residual blocks are stacked to capture as many levels of features as possible. This architecture allows smNet to learn different levels of features and to generate an optimal mapping from the input to the output.

Fully connected layers can be powerful in extracting features, but in the context of analyzing single molecule emission patterns, even networks composed of 1 or 2 fully connected layers require a huge amount of training data and expensive computational resources to produce meaningful results. On the other hand, the applicability of convolutional layers assumes that inputs are images or data which are spatially/locally correlated, which can be reasonably expected in single molecule datasets analyzed by smNet. A convolutional layer connects neurons in the local receptive field, which is a small region on one layer that will be connected to neurons in the next layer, which receptive field is moving across the image with the weights and biases unchanged.

Common problems with deep learning architectures are overfitting, vanishing/exploding gradient and excessive inactive neurons. Residual blocks address some of these issues and help make deep networks trainable. The inclusion of residual blocks in smNet improves precisions and reduces biases. The residual blocks in smNet can be expressed in the following form:

$$X^{r+1} = \sigma(R(w^r, X^r) + f(w^r_f, X^r)) \quad (1)$$

$$R(w^r, X^r) = BN(F_{c3}(w^{r_{l3}}, \sigma(BN(F_{c3}(w^{r_{l2}}, \sigma(BN(F_{c3}(w^{r_{l1}}, X^r))))))),$$

$$f(w^r_f, X^r) = \begin{cases} X^r, & \text{if } p = q \\ BN(F_{c1}(w^r_f, X^r)), & \text{if } p \neq q \end{cases}$$

where θ is PReLU, BN represents batch normalization, $w^r$ and $w_f^r$ are parameters in the residual function, R, and in the identity function, $f$, respectively. $X^r$ is the input of r-th residual block and $X^{r+1}$ is the output of r-th residual block. $F_{c3}$ is a 3×3 convolution and $w^{r_{l1}}$, $w^{r_{l2}}$ and $w^{r_{l3}}$ are parameters for each of the three convolutional layers denoted as $r_{l1}$, $r_{l2}$, $r_{l3}$, $F_{c1}$ is a 1×1 convolution. p and q are number of feature maps for $X^r$ and $X^{r+1}$ respectively.

In one feature of smNet, the activation function is PReLU (Parametric Rectified Linear Unit), which is a non-linear transformation. PReLU has the advantages of no saturation, computational efficiency and fast convergence, as compared with the commonly used activation function, ReLU (Rectified Linear Unit). PReLU is defined as:

$$\sigma(x) = \max(0,x) + a \times \min(0,x), \quad (2)$$

where a is the gradient of $\sigma(x)$ when x<0, and a is learned by smNet during training with an initial value of 0.25.

Forward propagating data in a training set one by one during each iteration can make the training process "noisy", i.e. the gradient can have a large fluctuation during training because the parameters are tuned based on a single training data at a time. Ideally, all the training data is processed at the same time through the network, so that the average gradient among the whole dataset is used to update the parameters. However, due to limited GPU memory and computational resource, it is not practical to forward propagate the whole training dataset, usually ~1 million images, at the same time. Instead, a batch of 128 images (empirically chosen) is processed together by smNet and the error gradient is the average gradient of the batch. In each iteration, the images are processed batch by batch. The normalization step is used to normalize the output distribution of each convolutional layer.

Figure 4:
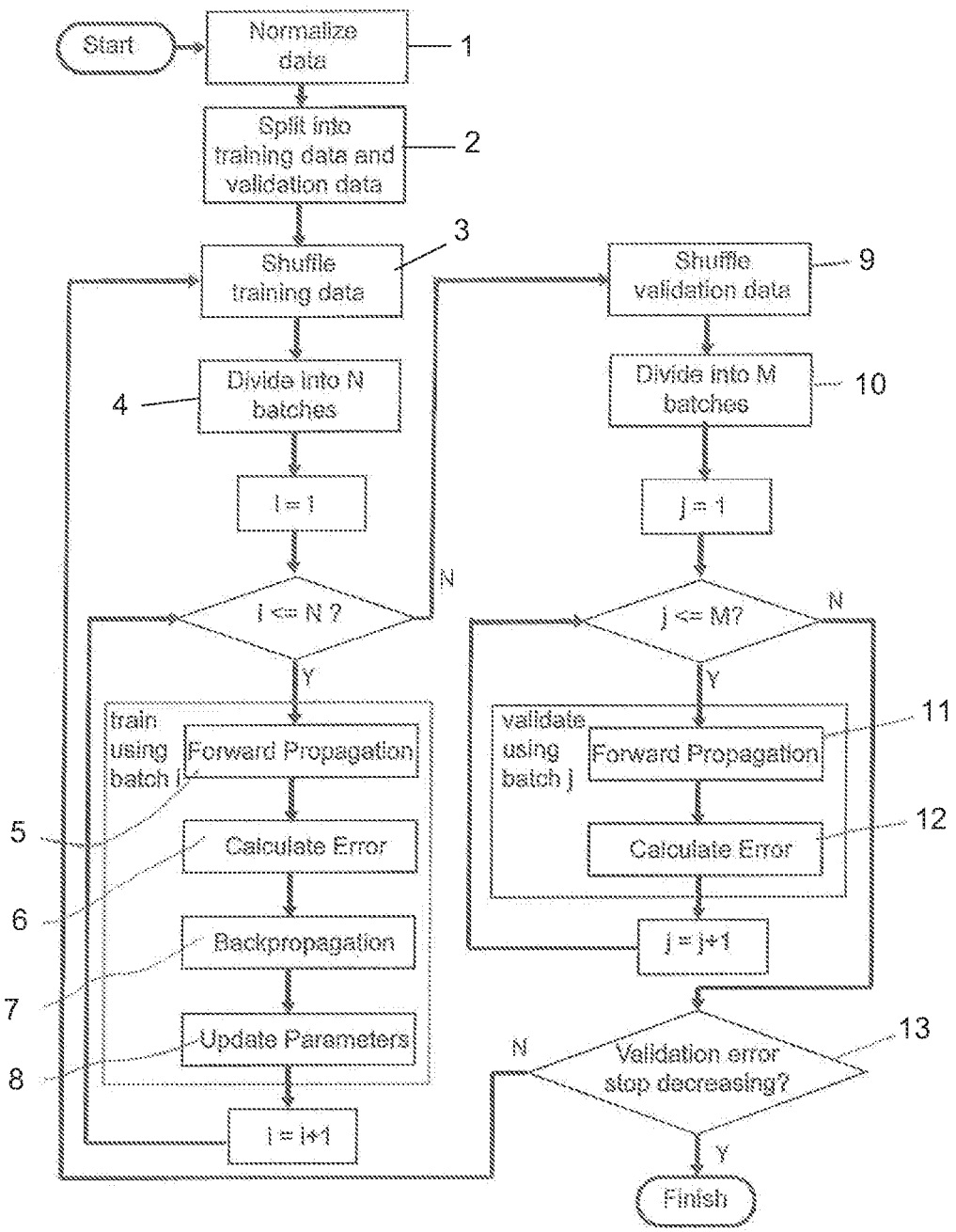
FIG. 4 is a flowchart of the steps for training the neural network disclosed herein.

The design of smNet architecture determines the performance limit of localization precision and accuracy, and the design of the training algorithm determines whether this limit can be achieved in practice. Thus, an optimized training algorithm is required to guarantee fast convergence to the global minimum of the cost function. A flowchart of the training algorithm is shown in FIG. 4. It can be appreciated that this training algorithm along with the smNet neural network, are implemented in a computer or other processor capable of performing the data processing and calculations embodied in the smNet architecture of FIG. 3. The dataset obtained in Step 1 is a set of images, such as the images I in FIG. 3, namely labeled images {(A$_1$, C$_1$), (A$_2$, C$_2$), . . . , (A$_N$, C$_N$)}, where A$_n$, with n=1,2,3, . . . , N, is a sub-region containing a PSF. C$_n$ is the true positions (x$_n$, y$_n$, z$_n$) and/or orientations (α$_n$, β$_n$) or Zernike coefficients (Zer$_{5n}$, Zer$_{6n}$, . . . , Zer$_{16n}$) or (Zer$_{5n}$, Zer$_{6n}$, . . . , Zer$_{25n}$) that are to be inferred from the corresponding PSF. In one embodiment, the whole dataset is normalized in Step 1 by dividing each pixel value by the maximum pixel value of the image. The data set is then split in Step 2 into a subset for training to tune the neural network parameters, and a subset for validation in general. In one embodiment, the original data set is split 75% for training and 25% for validation; however, it has been found that a 99%/1% split can generate comparable results when the total number of images is in the millions. The training dataset is used for updating smNet parameters, while the validation dataset is used to monitor the generalization capability of the network. The training dataset is shuffled in Step 3 and divided into N number of batches in Step 4, with each batch being processed in the training loop in Steps 5-8. The training loop begins with forward propagation in Step 5, which is the process of computing the output of the neural network shown in FIG. 3. As described above, the training data is divided into mini-batches in Step 4, with 128 images in each batch. Batch normalization (BN) is performed after each convolution, as depicted in the diagram of FIGS. 2-3. Where i=1,2,3, . . . represents the indices of mini-batches, then the output of a mini-batch i forward propagating through a layer l in each iteration is, $$A_i^{l+1} = \begin{cases} \sigma(BN(F^l(w^l, A_i^l))), & \text{when l is a convolutional layer} \\ \sigma(R(w^l, A_i^l) + f(w^l_f, A_i^l)), & \text{when } l \text{ is a residual block} \\ \sigma((F^l(w^l, A_i^l))), & \text{when } l \text{ is the first fully connected layer} \\ HT((F^l(w^l, A_i^l))), & \text{when } l \text{ is the last fully connected layer} \end{cases} \quad (3)$$

and the output of neural network is, $$\begin{Bmatrix} (\hat{x}, \hat{y}) \\ \hat{z} \\ \hat{\alpha} \\ \hat{\beta} \\ (\widehat{Zer_5}, \widehat{Zer_6}, \ldots, \widehat{Zer_{16}}) \\ (\widehat{Zer_5}, \widehat{Zer_6}, \ldots, \widehat{Zer_{25}}) \end{Bmatrix} = A_i^L, \quad (4)$$

where σ is PReLU and HT represents HardTanh, which is known in the art for use in preventing divergence in estimation results when the parameter range is known. (However, in the present embodiment of smNet, HardTanh is not used for azimuthal angle or wavefront distortion estimations due to difficulties in setting the HardTanh range). $F^l$ represents the linear transformation operated on $A_i^l$ with training parameter $w^l$, l=0,1,2, . . . L denotes the layer/residual block in neural network. $A_i^l$ is the input for l layer/residual block. $f$ is the identity function of the residual block described above.

For the single molecule emission patterns analyzed by smNet, the output of each iteration during training is the estimated positions ($\hat{x}$, $\hat{y}$, $\hat{z}$) and/or estimated orientations ($\hat{\alpha}$, $\hat{\beta}$) or estimated Zernike coefficients ($\widehat{Zer_5}, \widehat{Zer_6}, \ldots, \widehat{Zer_{16}}$) or ($\widehat{Zer_{25}}, \ldots, \widehat{Zer_5}, \widehat{Zer_6}$). The average error between the estimated parameters $\hat{\theta}$ and the ground truth θ is calculated in Step 6 by the following cost function for each mini-batch:

$$E_{\hat{\theta}} = \frac{1}{NT} \sum_{n=1}^{N} \sum_{t=1}^{T} \frac{(\hat{\theta}_{tn} - \theta_{tn})^2}{CRLB_{\theta_{tn}}}, \quad (5)$$

where N is the number of images in each batch, T is the size of the output vector for each image, and $CRLB_{\theta_{tn}}$ is the value of the Cramér-Rao lower bound (CRLB) for parameter $\theta_t$ of image A$_n$. The errors of ($\hat{x}$, $\hat{y}$) and $\hat{z}$ estimations are preferably calculated separately, because smaller bias and better precision is observed when training ($\hat{x},\hat{y}$) and $\hat{z}$ separately. Thus, the cost function is CRLB-weighted mean squared error (MSE). The CRLB weighting is important for the cost function, such that the algorithm will seek to improve precision with respect to the theoretical information limit predicted by CRLB for the particular parameter. Details of the CRLB and methods for its determination are discussed in R. J. Ober, S. Ram, E. S. Ward, Localization accuracy in single-molecule microscopy, *Biophys. J.* 86, 1185-1200 (2004); C. R. Rao, *Linear statistical inference and its applications*, (Wiley, New York, ed. 2, 2002); and S. Liu, K. A. Lidke, A multi-emitter localization comparison of 3D super-resolution imaging modalities, *ChemPhysChem.* 15, 696-704 (2014), the entire disclosures of which are expressly incorporated herein by reference. After computing the error of each mini-batch, the average error of all mini-batches is assigned as the training error of the iteration. The validation error is calculated in the same way in Step 12 of the validation loop. The changes in training and validation errors during the training process indicate the performance of the neural network. Normally, the training error decreases continuously, while the validation error decreases to a plateau. In one aspect of smNet, training is completed when the validation error stops decreasing consecutively for at least two, and preferably three, iterations (Step 13). Thus, Step 13 in FIG. 4 contemplates storing the validation error in the processor for multiple iterations and then comparing the successive validation errors to determine whether the errors have stopped decreasing, whether the errors have decreased only by a predetermined amount deemed to be equivalent to no further decrease, or whether the errors have started increasing. It is understood that the validation errors being considered are information-weighted as discussed above.

Backpropagation in Step 7 of FIG. 4 is the process of tuning training parameters w according to the CRLB-MSE error $E_{\hat{\theta}}$ calculated in Equation (5). The derivative of the training error with respect to each training parameter, $\partial E_{\hat{\theta}}/\partial w^l$, is calculated, such as through a chain-rule formula in smNet, although other methods can be employed to find the derivative. The average gradient for each mini-batch (identified in Step 4) is used to update the training parameters in each iteration according to the equation:

$$w_{k+1}^l = w_k^l - \frac{\eta}{M}\sum_{n=1}^{M}\frac{\partial E_{\hat{\theta}n,k}}{\partial w_{n,k}^l}, \quad (6)$$

where l=0,1,2, . . . , L denotes the layers in the neural network, η is the learning rate, k is the iteration number, and M is the number of images in each mini-batch. The newly calculated training parameter $w_{k+1}^l$ is then used in the next iteration of Steps 5-8.

In one embodiment of smNet, the calculation of derivatives and the choice of learning rate η are optimized using "Adam", a stochastic optimizer available in Torch packages (http://torch.ch/). (See, D. P. Kingma, J. Ba, Adam: a method for stochastic optimization, https://arxiv.org/abs/1412.6980 (2014); and S. Ruder, An overview of gradient descent optimization algorithms, https://arxiv.org/abs/1609.04747 (2016), the entire disclosures of which are expressly incorporated herein by reference). Instead of using a fixed learning rate, the Adam optimizer computes an adaptive learning rate for each parameter based on the estimates of the first and second moments of the gradient. In one specific embodiment, an initial learning rate of $1\times10^{-5}$ and the default settings for other parameters in the Torch package were used. After back propagation, the neural network parameters $w_{k+1}^l$ are updated using Equation (6) and the next batch is queued up for forward propagation using the newly-determined training parameters $w_{k+1}^l$.

Figure 5:
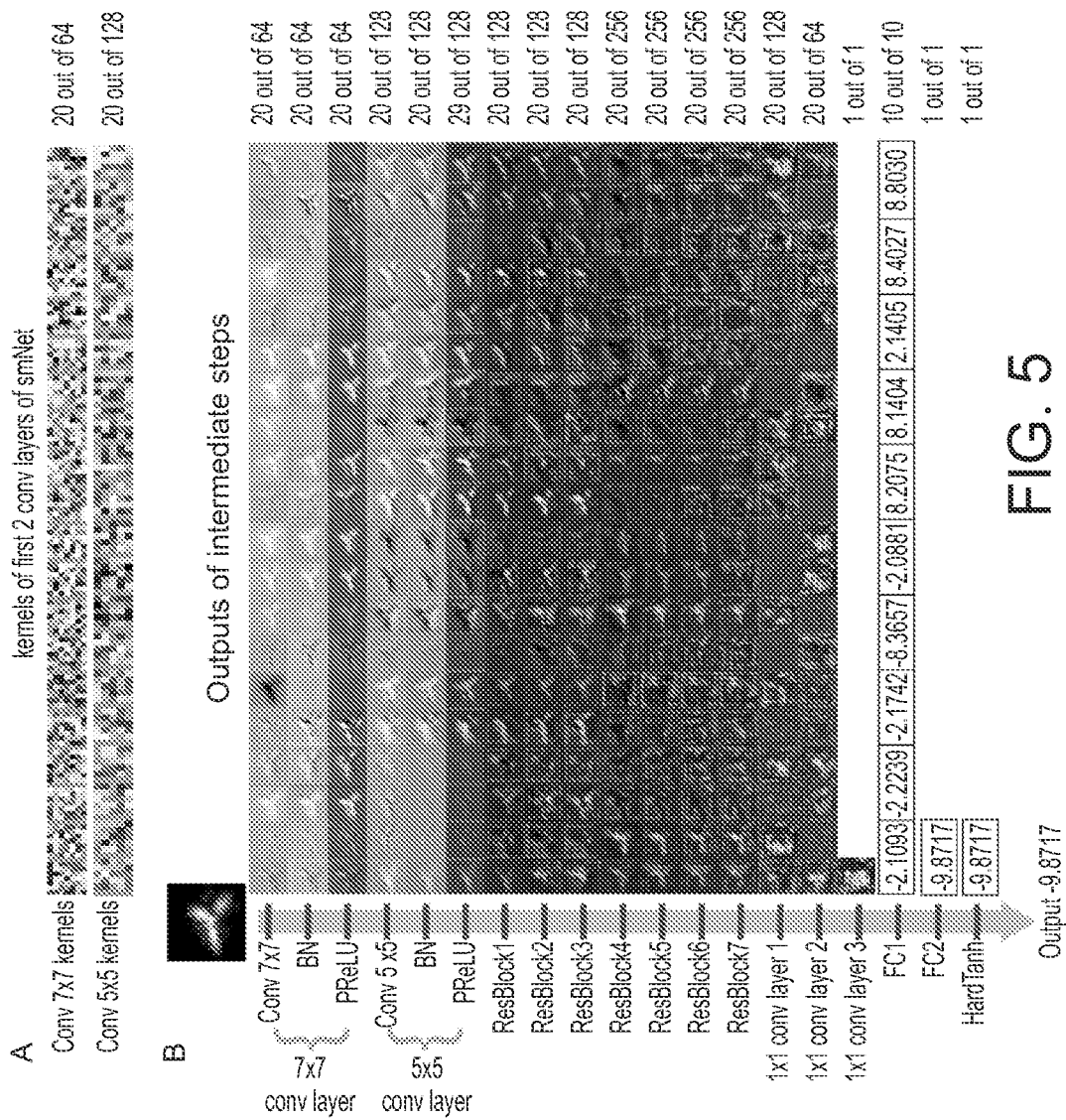
FIG. 5 are images at the output of each layer of the neural network in the exemplary embodiment disclosed herein.

The validation sequence commences at Step 9 after all of the N batches have been processed in the training steps. The validation dataset obtained from Step 2 is shuffled in Step 9 and divided into M batches in Step 10. The validation dataset only undergoes forward propagation in Step 11, after which the error calculation of Equation (5) above is applied in Step 12 of the validation loop. The CRLB-weighted mean squared-validation error thus calculated is evaluated after all of the validation dataset has been processed, in Step 13, to determine whether the validation error has stabilized or stopped decreasing. If not, then the iteration continues, returning to Step 3 where the training batches are shuffled again. The next iteration of the training and validation loops continues with the training parameters updated from the previous iteration. This process continues until the validation error stops decreasing (Step 13) (or exhibits a predetermined rate of decrease taken as a stop in the decrease of the validation error), at which time the training process is completed and the neural network parameters are fixed. The neural network is then capable of evaluating unknown PSFs and extracting the particular information for the single molecule (e.g., 3D position, orientation, wavefront distortion) for which the network has been trained. FIG. 5 shows the smNet kernels and outputs at each layer of the smNet shown in the diagram of FIG. 3, applied to the experimental PFS shown in FIG. 2, leading to the final output O indicative of the axial position of the single molecule.

In the context of analyzing complex single molecule emission patterns, the smNet neural network can be trained with experimental PSFs and simulated PSFs interpolated from either scalar diffraction theory or vector theory. In both methods, PSFs were generated as follows: (1) generating a normalized PSF, $\mu_0$, with random position (x, y, z) and/or at a random orientation ($\alpha$, $\beta$) and/or random wavefront distortion ($Zer_1$, $Zer_2$, . . . , $Zer_n$); (2) multiplying the normalized PSF with a random total photon count, l, and add a random background count, bg to obtain μ, $$\mu(x, y, z) = I\mu_0(x, y, z) + bg, \text{ or} \quad (7)$$
$$\mu(x, y, z, \alpha, \beta) = I\mu_0(x, y, z, \alpha, \beta) + bg, \text{ or}$$
$$\mu(x, y, z, Zer_1, Zer_2, \ldots, Zer_n) = I\mu_0(x, y, z, Zer_1, Zer_2, \ldots, Zer_n) + bg;$$

and then (3) corrupting μ with Poisson noise. The training dataset (the sum of training and validation datasets) for smNet can contain 200,000 to 5 million PSF images with known estimation parameters. The detailed parameters used for generating training datasets for several complex PFS types are shown in the table of FIG. 6.

Training data of experimental complex PSFs can be obtained by interpolating a stack of recorded sample PSF images. The sample PSFs contains L images, each image being a N by N matrix normalized to a sum of 1. It is assumed that the stage position represents the emitter's axial position and that the stage has no lateral shift during acquisition. Thus, the emitter's position in each image of the sample PSF is (0, 0, $z_s$), where $z_s$ represents the axial position of the stage ranging from −1.5 μm to 1.5 μm with an interval of 10 nm. The process of generating experimental complex PSF located at an arbitrary position, (x, y, z), can follow these steps. In the first step, the PSF image is generated at position (0, 0, z) by linear interpolation. First the sample PSFs are reshaped to be a $N^2$ by L matrix, denoted as M. Then from each column vector in M, a scalar is generated using Matlab (MathWorks, Natick, MA) function interp1, given the input value z, then the output from all columns is a vector with $N^2$ elements. The vector is then reshaped into a N by N matrix that represents the PSF at position (0, 0, z) and denoted as $u_0(0, 0, z)$. In the next step, the PSF image is generated at position (x, y, z) by applying a lateral-shift using Fourier transform. First the Fourier transform is calculated for the PSF images obtained from step 1, $$\hat{\mu}_0(k_x, k_y) = \mathcal{F}[\mu_0(0,0,z)], \tag{8}$$

where $k_x$ and $k_y$ are the lateral components of the wave vector k with magnitude $n/\lambda$, n is the refractive index of the immersion medium and $\lambda$ is the wavelength of the emission light. Then a lateral-shift phase is applied and the modulus of its inverse Fourier transform is calculated, $$\mu_0(x,y,z) = |\mathcal{F}^{-1}[\hat{\mu}_0(k_x,k_y)e^{i2\pi(k_x x + k_y y)}]| \tag{9}$$

where $\mu_0(x, y, z)$ represents the normalized PSF at position (x, y, z).

Training data can also include simulated PSFs based on scalar diffraction theory, double-helix PSFs based on propagation-invariant wave fields and dipole PSFs based on a fixed dipole emitter.

In accordance with the present disclosure, one important feature of smNet is that the training cost function (Equation 5) is designed to measure the relative difference between the measurement error of a specific single-molecule property and the information limit calculated by the Cramér-Rao lower bound (CRLB) for each training image. The CRLB expresses a lower bound on the variance of unbiased estimators of a deterministic parameter, such as the parameters $\theta_t$ of image $A_n$. With this design, the training process of smNet tunes the parameters to achieve the specific CRLB set by the inherent information content of each image. This allows smNet to extract information close to the theoretical limit at a large range of detected photons and background levels simultaneously. In accordance with the present disclosure, it is sufficient to train smNet with ~1 million PSF patterns for each inference task with a reasonably large range of their measured properties.

The CRLB limits the estimation precision of a parameter for an unbiased estimator, $$\mathrm{var}(\theta_i) \geq [F(\theta)^{-1}]_{ii}, \tag{10}$$

where F is the Fisher information matrix, $\theta$ is a vector of estimation parameters, i denotes the index of each parameter. For the present disclosure, the Fisher information matrix is calculated from the likelihood function of a given PSF model. However, most of the PSF models described herein do not have an analytical expression and therefore, each element of Fisher information matrix is calculated numerically, $$F_{ij} = E\left[\frac{\Delta\ln(L(\theta|D))}{\Delta\theta_i}\frac{\Delta\ln(L(\theta|D))}{\Delta\theta_j}\right], \tag{11}$$

where the likelihood function of data D under a Poisson process is, $$L(\theta|D) = \prod_q \frac{\mu_q^{D_q} e^{-\mu_q}}{D_q!}, \tag{12}$$

where μ represents the PSF model and q is the pixel index. Assuming any two different pixels are independent, then $$F_{ij} = \sum_q \frac{1}{\mu_q}\frac{\Delta\mu_q}{\Delta\theta_i}\frac{\Delta\mu_q}{\Delta\theta_j}, \tag{13}$$

For PSF models generated from pupil function and interpolation, the estimation parameter $\theta$ includes x, y, and z positions, the total photon count, I, and the background, bg. For the PSF model of a fixed dipole emitter, the estimation parameter $\theta$ includes x, y, and z positions, the total photon count, I, the background, bg, the polar angle of the dipole moment, $\alpha$, and the azimuthal angle of the dipole moment, $\beta$. The estimation parameter $\theta$ for biplanar detection includes x, y, and z positions, the total photon counts, I, the background, bg, and the Zernike coefficients.

In testing the performance of smNet, the precision and accuracy of the neural network was determined when pinpointing single-molecule centers on both simulated and experimentally obtained single-molecule patterns. It was found that smNet localizes single molecules at a precision matching the theoretical information limit given by the CRLB with a small or ignorable bias despite the significant amount of aberrations and PSF complexity. In specific examples, the bias±s.t.d. for an astigmatism aberration was 2.35±2.71 nm, 1±0.84 nm for double helix PSFs, 2±1.8 nm for simulated complex PSFs; and 102.1±7 nm for experimental complex PSFs. This performance is consistently achieved at various conditions such as molecule locations, intensity and background levels. smNet can also be implemented in three-dimensional single-molecule switching nanoscopy (SMSN) experiments. SMSN relies on localization of millions of PSFs down to a precision of 10-25 nm, which together with localization accuracy are essential to successfully reconstruct SMSN images. Using smNet, 3D-SMSN volumetric images were reconstructed of the fluorescently labeled mitochondrial protein, TOM20 in COS-7 cells, imaged either at the bottom coverslip or through a ~12 μm thick sample cavity. In the testing, smNet learned to build a deep network from PSF images generated from an experimentally retrieved pupil, containing measured optical aberrations, modeled by 64 Zernike polynomials, which allowed smNet to retrieve the correct molecular positions despite a significant amount of aberrations. The x-z cross sections of the mitochondria outer membrane show significant artifacts from conventional Gaussian-based methods, while smNet accurately reconstructed the surface contours of the subcellular organelles despite the imaging depth.

Single-molecule emission patterns can be designed to evolve and encode molecular properties, such as three-dimensional positions, probe spectra, identities and orientations. However, encoding two or more classes of information in the emission patterns will increase their dimensionality, which challenges the traditional decoding processes such as feature recognition and regression. The neural network smNet disclosed herein learns to recognize PSF features to extract the desired measurement through the information-limit weighted cost-function of Equation (5) above. During this process, smNet optimizes its parameters specifically for a certain measurement task, ignoring other irrelevant features. Accordingly, smNet allows independent and therefore parallel inference of the spatial location together with the polar and azimuthal angles from a single-molecule dipole-emission pattern with little change to its architecture. The inference precisions for all five dimensions closely approach the information limits in a large parameter range while degeneracies and wrappings of both polar and azimuthal angles can also be correctly predicted.

In further tests, smNet was used for measuring wavefront distortions within a specimen. While a single-molecule dataset contains emission patterns originating from different locations within the detected region of the specimen, these patterns share a similar wavefront distortion induced by the inhomogeneous refractive indices of cell and tissue structures. smNet, makes measurements (e.g. the amount of horizontal coma) from the common features of the PSF patterns and directly extracts the shared wavefront distortion from a small collection of detected emission patterns without any additional information. Thus, smNet is capable of simultaneously measuring amplitudes of 12-21 Zernike polynomials (Wyant order), representing wavefront shapes, while achieving a residual wavefront error of <30 mλ. Importantly, smNet is able to measure wavefront distortion without a guide star, or scanning a bead sample which restricts the wavefront measurement from the actual imaging volume. Using smNet, sample induced aberration can be extracted through the raw single-molecule blinking data itself allowing wavefront measurement deep into the specimen.

In accordance with the present disclosure, smNet is a deep neural network well-suited for complex and high-dimensional analysis of single-molecule emission patterns. Using either computer-generated or experimentally-obtained datasets, both general and subtle features of single-molecule emission patterns can be learned close to the information limit of the data for tasks including determination of 3D position, orientation and measurement of wavefront distortion. The designed architecture and network depth ensure smNet's performance in precision, accuracy and speed. Furthermore, smNet decouples high-dimensional single-molecule measurement from limitations in human-based feature recognition, model simplification and regression, and therefore allowing encoding and extracting highly multiplexed physical and physiological information through the emission pattern of a single molecule.

It is understood that smNet and the deep neural network disclosed herein provides a computer-implemented method for identifying unknown physical parameters from the point spread function (PSF) of an image of a single molecule. The physical parameters can include one or more of axial (z) position, lateral (x, y) position, wavefront distortion and dipole orientation of the single molecule. The smNet is trained as described above and is maintained in a processor for receiving a new dataset for an image having unknown physical parameters. Thus, in one embodiment, the processor receives a new dataset of an N×N pixel image of the PSF emission patterns corresponding to the unknown physical parameters, and this dataset is forward propagated through the trained neural network to generate an output vector with values corresponding to the one or more physical parameters.

In one experimental setting, all experimental data (except for complex PSFs and wavefront estimation data) were recorded on a custom-built single molecule switching nanoscopy (SMSN) setup built around an Olympus IX-73 microscope stand (IX-73, Olympus America Inc., Waltham, MA) with a 100×/1.35 NA silicone oil-immersion objective lens (FV-U2B714, Olympus America Inc.), a 405 nm laser (DL-405-100, CrystaLaser, Reno, NV) and a 642 nm laser (2RU-VFL-P-2000-642-B1R, MPB Communications Inc.) for activation and excitation, respectively. The filter turret contains a dichroic mirror (Di03-R405/488/561/63541, Semrock Inc.). A deformable mirror (MultiDM-3.5, Boston Micromachines, Cambridge, MA) placed at the conjugated pupil plane was used for correcting systematic aberrations and introducing astigmatism for 3D SMSN. Collected fluorescence emission passed through a bandpass filter (FF01-731/137-25, Semrock Inc.) placed just before the camera. The fluorescence signal was recorded on an EMCCD camera (C9100-23B, Hamamastu, Tokyo, Japan). The overall system magnification was ~141×, resulting in an effective pixel size of 113 nm.

For wavefront distortion measurements, the fluorescence emission after the imaging lens was split into two beam paths by a 50/50 beam splitter (BS016, Thorlabs). A small optical path length difference was introduced between the two paths to create a dual-focal plane configuration, resulting in a plane separation of 430 nm at the sample plane. The two beams were then combined by a right angle mirror (47005, Edmund Optics) and received by a sCMOS camera (Orca-Flash4.0v3, Hamamastu). The overall system magnification was ~53×, resulting in an effective pixel size of 122 nm. A 100×/1.4 NA oil immersion objective (UPLSAPO 100XO, Olympus America Inc., Waltham, MA) was used for wavefront distortion measurements.

In one embodiment, the deep neural network of the present disclosure, smNet, includes three to five convolution layers, seven to eleven residual blocks and zero to two fully connected layers, as shown in FIG. 3. Each convolutional layer is followed by batch normalization and PReLU, except for the last convolutional layer in M3. The first fully connected layer (FC) is followed by a PReLU and the last FC is followed by a HardTanh (https://github.com/torch/nn/blob/master/doc/transfer.md). Detailed information about smNet architecture for different parameters is shown in the table in FIG. 7. The number of layers depends on the parameter being estimated, as represented by the columns labeled "M0", M1" and "M2" in the table of FIG. 7. The architecture for x, y, z, α, β estimations is in column M0, 12 Zernike wavefront mode estimations in column M1 and 21 Zernike wavefront mode estimations in column M2.

In order to fully utilize the information contained in the spatial domain, larger kernels were used in the beginning layers as compared to later layers of the neural network. In order to capture as many rich features from the input image and PSF as possible in a trainable neural network, the smNet network includes a stack of 7 to 11 residual blocks, with each residual block utilizing the 'bottleneck' structure, where the number of features is first squeezed and then expanded. In later layers, there is much less spatial information left to be learnt by smNet, so the last convolutional layers are 1×1.

In this example, the output O of smNet is a vector of 12 or 21 elements representing the amplitudes of 12 or 21 Zernike modes, or a vector of 2 elements representing x and y coordinates, or a scalar representing the z position, polar angle (α) or azimuthal angle (β). This vector is the output of the inference mode of operation of the neural network disclosed herein that is interpreted to provide information about the physical parameters of the imaged single molecule, as discussed above. Since, x, y positions are based on the emitter's location in the sub-region, and since the axial position, polar and azimuthal angles and wavefront distortions are based on the shape information or a combination between shape and position information of the emitter, separate networks (with the same architecture) were constructed to perform these different tasks. Referring to the basic architecture of the smNet neural network, because the input image size of smNet is usually small (32×32 or 16×16), small kernel sizes (such as 7×7, 5×5, 3×3 and 1×1) were used in the convolutional layers CO. The first two convolutional layers used 7×7 and then 5×5 convolutional kernels (7×7→5×5) to capture general features. For the three convolutional layers inside each residual block, kernels of 3×3 were used. The three convolutional layers after the residual block were designed for gradually decreasing the number of feature maps to reduce redundant connections in the subsequent fully connected layers. Thus, a convolutional kernel size of 1×1 was used in these layers CO.

For wavefront distortion estimation, the images I were sampled with stride. As is known in the art, taking stride of 1 means moving kernels 1 pixel at a time across the image. In the specific embodiment represented in the table of FIG. 7, a stride of four was added in the $4^{th}$ residual block for estimating the amplitudes of 12 Zernike modes (from astigmatism to $2^{nd}$ spherical), and a stride of four was added in the $4^{th}$ and $8^{th}$ residual blocks for estimating 21 Zernike modes (from astigmatism to $3^{rd}$ spherical).

Further details of the neural network smNet, including experimental verification of smNet, are found in the Appendix, the entire disclosure of which is expressly incorporated herein by reference.

The present disclosure should be considered as illustrative and not restrictive in character. It is understood that only certain embodiments have been presented and that all changes, modifications and further applications that come within the spirit of the disclosure are desired to be protected. In particular, the information content weighted error determination expressed in Equation (5) is based on an information limit using the CRLB. However, other measures of the information content of a data set for the evaluated physical parameters are contemplated to weight a mean-square error calculation. In these alternative embodiments, Equation (5) can become:

$$E_{\hat{\theta}} = \frac{1}{NT}\sum_{n=1}^{N}\sum_{t=1}^{T}\frac{(\hat{\theta}_m - \theta_m)^2}{\text{Measure}_{\theta_{tm}}}, \quad (5a)$$

where N is the number of images in each batch, T is the size of the output vector for each image, and $\text{Measure}_{\theta_{tm}}$ is the value for parameter $\theta_t$ of image $A_n$ of a measure of the information content of the dataset. In Equation (5), the value $\text{Measure}_{\theta_{tm}}$ is the CRLB, but in other embodiments this value $\text{Measure}_{\theta_{tm}}$ can be an expected uncertainty due to noise or a generic measure of signal-to-noise ratio for the dataset. The object of the denominator $\text{Measure}_{\theta_{tm}}$ is to weight the error or cost function calculation toward a theoretical limit of the information available in the particular PSF dataset. The CRLB in the illustrated embodiment is one significant measure of information content that can be readily and reliably adapted to a computer processor-implemented neural network.

What is claimed is:

1. A computer-implemented method for training a neural network for use in extracting physical information from an image of point spread function (PSF) emission patterns of illuminated single molecules, the emission patterns corresponding to ground truth parameters $\theta_{tn}$ indicative of the physical information of the molecule, the method comprising:

(a) acquiring a dataset of a plurality of N×N pixel images $A_n$ of the PSF emission patterns and providing the dataset to a processor;

(b) forward propagating the dataset through a neural network, with the processor, comprising a plurality of convolutional and residual layers l and a plurality of training parameters $w^l$ of the layers l, to generate an output vector of a number of physical parameters $\hat{\theta}_m$ in a $k^{th}$ iteration through the neural network;

(c) determining with the processor a measure of the information content of the dataset regarding the number of physical parameters;

(d) comparing, with the processor, the output physical parameters $\hat{\theta}_m$ to the ground truth parameters $\theta_m$ by calculating a mean squared error (MSE) weighted by the measure of information content based on the equation $$E_{\hat{\theta}} = \frac{1}{NT}\sum_{n=1}^{N}\sum_{t=1}^{T}\frac{(\hat{\theta}_m - \theta_m)^2}{\text{Measure}_{\theta_{tm}}},$$

where N is the number of images $A_n$, T is the size of the output vector for each image, and $\text{Measure}_{\theta_{tm}}$ is the value for parameter $\theta_t$ of image $A_n$ of the information content of the dataset;

(e) updating, with the processor, the parameters $w^l$ of the layers l of the neural network based on the derivative of the CRLB-weighted MSE according to the equation $$w^l_{k+1} = w^l_k - \frac{\eta}{M}\sum_{n=1}^{M}\frac{\partial E_{\hat{\theta}_{n,k}}}{\partial w^l_{n,k}},$$

where l=0,1,2, ... L denotes the layers in the neural network, $\eta$ is the learning rate, k is the iteration number, and M is the number of images $A_n$; and (f) repeating steps (c)-(e) for successive iterations until the error $E_{\hat{\theta}}$ reaches a predetermined limit, after which the parameters $w^l$ of the layers l of the neural network are assigned, with the processor, the updated values of the last iteration for subsequently using the neural network, with the processor, to identify unknown physical parameters from the PSF of a new image of a single molecule.

2. The method of claim 1, wherein the physical parameters include one or more of axial (z) position, lateral (x, y) position, wavefront distortion and dipole orientation of the single molecule.

3. The method of claim 2, wherein the output vector includes at least two physical parameters.

4. The method of claim 1, wherein the plurality of layers of the neural network includes a fully connected layer between the output and the last one of the convolutional and residual layers.

5. The method of claim 4, wherein the plurality of layers of the neural network includes a Hard Tanh layer between the fully connected layer and the output.

6. The method of claim 1, wherein each residual layer includes a PreLU (Parametric Rectified Linear Unit) activation function at the output of each residual layer.

7. The method of claim 1, wherein the measure of information content is a Cramér-Rao lower bound (CRLB) for the dataset.

8. The method of claim 1, further comprising:
dividing the acquired dataset into a training dataset and a validation dataset;

forward propagating both datasets through said neural network;

for both datasets, calculating the mean squared error weighted by the information content; and comparing the error for the validation dataset to said predetermined limit.

9. The method of claim 8, wherein the predetermined limit is when the error for the validation dataset stops decreasing between successive iterations of Steps (c)-(e).

10. The method of claim 1, wherein after acquiring the dataset, the dataset is batch normalized by dividing each pixel value within the dataset by the maximum pixel value of the image.

11. The method of claim 1, further comprising the step of shuffling the order of the images within the dataset prior to forward propagating the dataset through the neural network for each of the successive iterations.

\* \* \* \* \*